United States Patent [19]

Laskaris et al.

[11] Patent Number: 4,568,908

[45] Date of Patent: Feb. 4, 1986

[54] COMPACT RESISTOR ASSEMBLY

[75] Inventors: Evangelos T. Laskaris, Schenectady; Donald W. Jones, Burnt Hills, both of N.Y.

[73] Assignee: General Electric Company, Schenectady, N.Y.

[21] Appl. No.: 686,170

[22] Filed: Dec. 24, 1984

[51] Int. Cl.$^4$ ............................................. H01C 7/22
[52] U.S. Cl. .................................. 338/295; 338/280; 338/287; 338/320; 219/537
[58] Field of Search ................. 338/61, 280, 283, 284, 338/287, 295, 281, 288, 320, 326, 333; 174/36, 105 B, 126 S, 128 S, 113 R; 310/72, 208; 29/605; 219/537

[56] References Cited

U.S. PATENT DOCUMENTS

| | | | |
|---|---|---|---|
| 701,012 | 5/1902 | Brown et al. | 338/284 X |
| 890,858 | 6/1908 | Hadaway, Jr. | 338/287 X |
| 2,928,964 | 3/1960 | Jones | 310/208 |
| 2,962,613 | 11/1960 | Maher et al. | 310/208 |
| 3,431,639 | 3/1969 | Reimer et al. | 29/605 |
| 3,431,705 | 3/1960 | Schmermund | 338/283 X |
| 4,463,338 | 7/1984 | Utmer et al. | 338/281 |
| 4,496,933 | 1/1985 | Martin et al. | 338/295 X |

Primary Examiner—Volodymyr Y. Mayewsky
Attorney, Agent, or Firm—William H. Steinberg; James C. Davis, Jr.; Paul R. Webb, II

[57] ABSTRACT

The resistor assembly includes a plurality of resistor sections each in the form of resistive plates in which slots have been cut to provide a continuous resistive element of low inductance. The resistor sections are stacked together with thin insulating sheets separating adjacent resistor sections. The resistor sections are serially interconnected. Taps are provided on selected resistor sections to form a plurality of serially connected resistors in which each resistor is electrically isolated from an adjacent resistor but closely thermally coupled thereto. The resistive plates are bound together by discrete bands of an insulating material such as glass cloth tape. Epoxy impregnation allows the resistor assembly when connected in shunt with series connected superconductive coils to be immersed in the liquid helium of a magnet cryostat without causing excessive pressure rise during a quench event.

6 Claims, 3 Drawing Figures

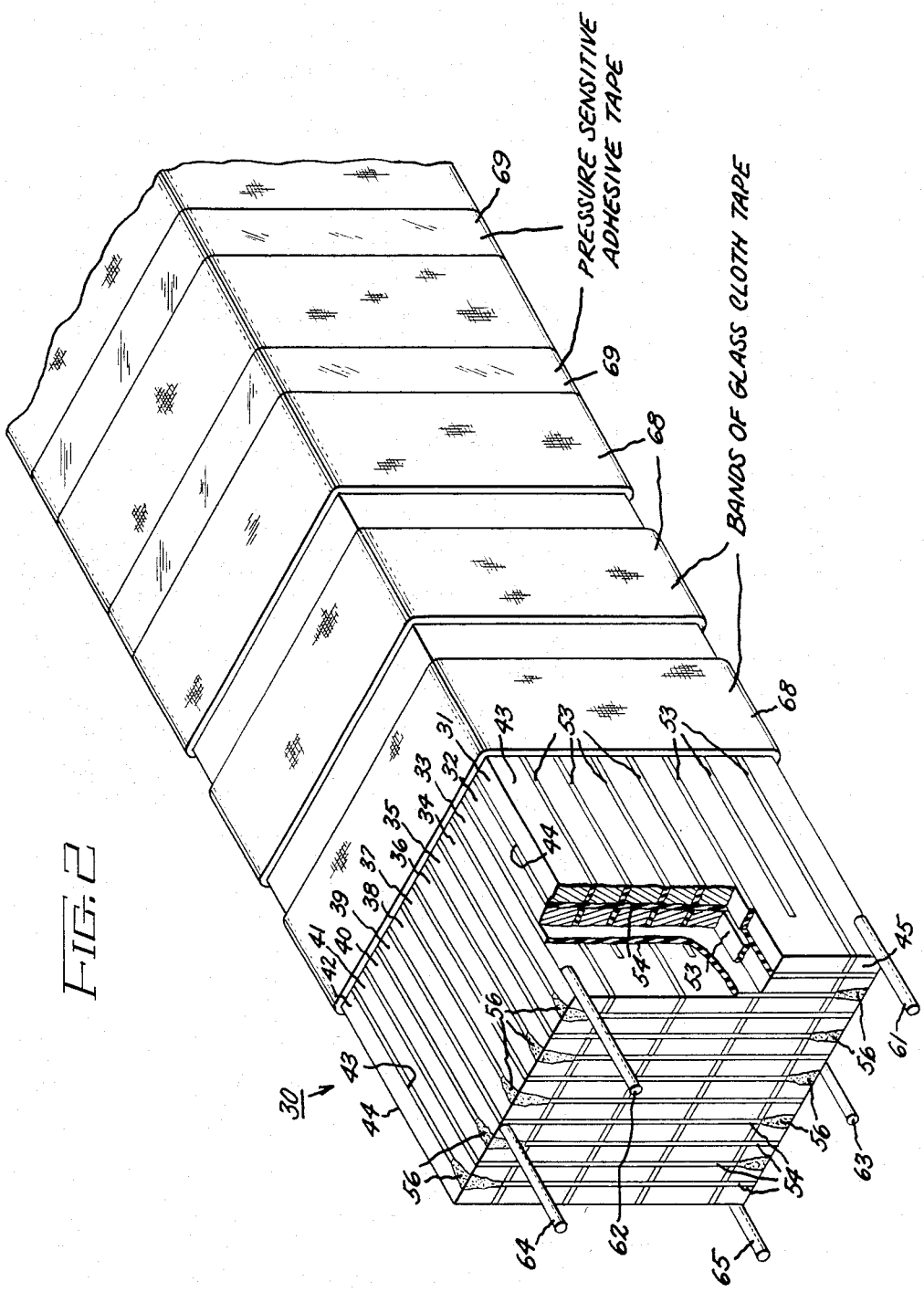

COMPACT RESISTOR ASSEMBLY

BACKGROUND OF THE INVENTION

The present invention relates, in general, to a compact resistor assembly and particularly to a compact resistor assembly for use with a multi-coil, high energy superconducting solenoid.

One form of such a solenoid comprises a plurality of superconducting coils connected in series. The solenoid is connected in circuit with a superconducting switch. A plurality of protective resistors is provided with each resistor connected in shunt with a respective one of the superconducting coils. During normal operation, with the coils, the superconducting switch and the resistors immersed in liquid helium in a cryostat, a presistent current flows through the coils. As long as the coils are in the superconducting state, no current flows through the protective shunt resistors. If one of the coils were to go normal, current would pass through the resistor in shunt therewith. With properly chosen circuit parameters, the energy passing into the circuit from the collapsing magnetic field would be primarily dissipated in the resistor shunting the coil thus protecting the quenched coil from thermal damage. If the other resistors were thermally independent of each other, each of the resistors would need to have sufficient thermal mass to absorb substantially all of the energy from the multicoil solenoid without overheating. If, however, the several resistors are in close thermal contact, the sum of all their thermal masses would be effective in absorption of energy and the total mass required would be minimized.

It is also desirable to thermally isolate the shunt resistors from the liquid helium bath in order to control the rate of pressure buildup in the cryostat during the heat up of a resistor. The assembly of shunt resistors must contain no voids that can accumulate liquid helium in order to prevent a potentially damaging pressure rise within the structure of the resistors themselves.

In order to be able to accurately monitor the field strength of the solenoid during a ramping of the current in the solenoid, the assembly of shunt resistors should produce negligible external magnetic field when current is flowing in the resistors due to the induced voltage across the coils. The ohmic values of the shunt resistors of the assembly should be proportional to the effective inductances of the individual coils that they shunt.

SUMMARY OF THE INVENTION

The present invention is directed to the provision of a resistor assembly that meets the requirements set forth above.

Accordingly, it is an object of the present invention to provide a compact resistor assembly in which the total mass thereof absorbs thermal energy even though only a portion thereof is dissipating electrical energy.

It is another object of the present invention to provide a resistor assembly which is insulated from the liquid coolant medium in which it may be immersed.

It is another object of the present invention to provide a resistor assembly which is noninductive.

In carrying out the invention in one illustrative embodiment thereof, there is provided a plurality of resistor sections. Each section includes a resistive plate of a rectangular parallelepiped outline including a first pair of closely spaced parallel sides of rectangular outline and a second pair of remotely spaced parallel sides of rectangular outline. A first plurality of narrow parallel slots are provided each extending from one side to the other side of the first pair of sides and from the one side of the second pair of parallel sides for a distance short of the other side of the second pair of parallel sides. A second plurality of narrow parallel slots are provided each extending from one side to the other side of the first pair of parallel sides and from the other side of the second pair of parallel sides for a distance short of the one side of the second pair of parallel sides. The second plurality of slots is interleaved with the first plurality of slots whereby the resistive plate is divided into a plurality of strips forming a zig-zag grid. The strips form a continuous resistive element from the lowermost strip to the uppermost strip. A plurality of first insulating members is provided, each member situated in a respective one of the first and second plurality of slots. A plurality of thin insulating sheets are provided. Means are provided for bonding the plurality of resistor sections together with the side of the first pair of sides thereof in parallel and each of the insulating sheets located between adjacent sides of respective adjacent resistor sections. Means are provided for conductively connecting alternate adjacent uppermost strips of the assembly of resistor sections starting with the first set of adjacent resistor sections. Means are provided for conductively connecting alternate adjacent lowermost strips starting with the second set of adjacent resistor sections. A plurality of conductive lines are provided, each connected to a respective selected strip of the resistor sections. Thus, a specific resistive element is provided between a pair of conductive lines, the resistive element being thermally coupled to adjacent resistive elements but electrically insulated therefrom.

BRIEF DESCRIPTION OF THE DRAWINGS

The novel features which are believed to be characteristic of the present invention are set forth with particularity in the appended claims. The invention itself, both as to its organization and method of operation together with further objects and advantages thereof, may best be understood by reference to the following description taken in connection with the accompanying drawings wherein:

FIG. 2 shows a perspective view of an embodiment of a shunt resistor assembly in accordance with the present invention for use in the circuit of FIG. 1.

DETAILED DESCRIPTION OF THE INVENTION

Figure 1:
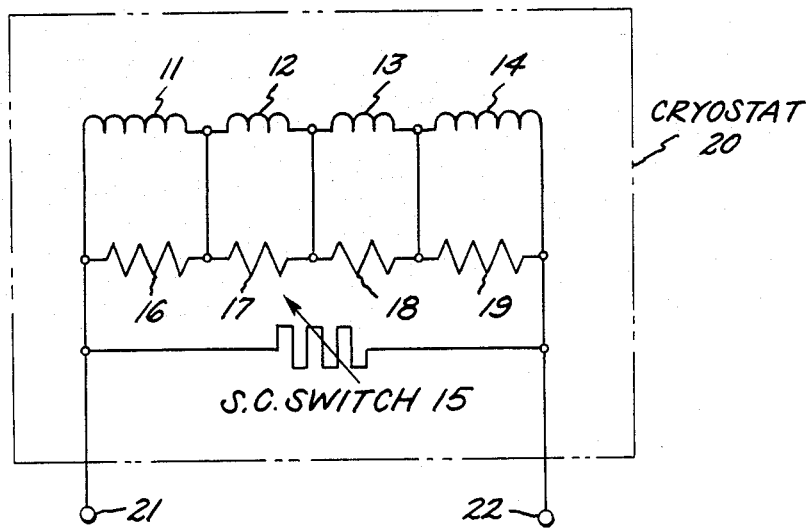
FIG. 1 shows a schematic electrical circuit diagram of a persistent current, multi-coil magnet or solenoid incorporating shunt resistors.

FIG. 1 shows a schematic electrical circuit diagram of a persistent current, multi-coil magnet or solenoid incorporating protective shunt resistors. The circuit includes coils 11, 12, 13 and 14, superconducting switch 15 and resistors 16, 17, 18 and 19. The coils 11, 12, 13, 14 and switch 15 are constituted of superconductive material such as alloys of niobium and titanium. Resistors 16, 17, 18 and 19 are constituted of conventional resistive material such as brass. The coils 11, 12, 13, 14 and the superconducting switch 15 are connected in a loop by means of leads which are constituted of superconductive materials. Each of resistors 16, 17, 18 and 19 is connected across a respective one of coils 11, 12, 13 and 14. Current for energizing the magnet is provided by means of terminals 21 and 22 connected to respective ends of superconducting switch 15. These circuit elements are typically disposed within a coolant such as liquid helium contained in a cryostat 20 so as to maintain temperature of the superconductive elements below the critical temperature for superconductivity (typically about 10° K.). Each of the conventional resistive elements 16, 17, 18, 19 provide a means for dissipating stored magnetic energy in the event that the respective coil enters the resistive or ohmic state.

The present invention is directed to the provision of a resistor assembly comprising a plurality of resistors such as resistors 16, 17, 18 and 19, which provide the desired resistances and which minimizes the total thermal mass required to be provided by the resistors in the aggregate.

Figure 3:
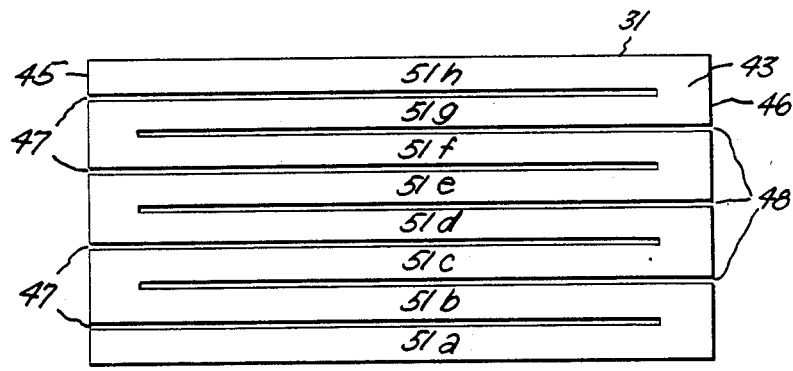
FIG. 3 shows a side view of a resistor section of the resistor assembly of FIG. 2.

Reference is now made to FIG. 2 which shows a perspective view partially exposed of the resistor assembly 30 in accordance with the present invention and to FIG. 3 which shows a side view of a resistor section 31 of the resistor assembly of FIG. 2. The resistor assembly 30 includes a plurality of identical resistor sections 31–42. Each of the resistor sections 31–42 includes a resistive plate of a parallelpiped outline including a first pair of closely spaced parallel sides or rectangular outline 43 and 44 and also includes a second pair of remotely spaced parallel sides of rectangular outline 45 and 46. A first plurality of narrow parallel slots 47 are provided each extending from side 43 to side 44 of the first pair of parallel sides and also extending from side 45 of the second pair of parallel sides for a distance short of the other side 46 of the second pair of parallel sides. A second plurality of narrow parallel slots 48 are provided each extending from side 43 to side 44 of the first pair of parallel sides and also extending from side 46 of the second pair of parallel sides for a distance short of the other side 45 of the second pair of parallel sides. The first pair and second pair of slots 47 and 48 are interleaved to divide the plates of which the resistor sections 31–42 are formed into a plurality of strips 51a–51h. Thus, a continuous resistive element is formed from the lowermost strip 51a to the uppermost strip 51h. As current travels in opposite directions in a pair of adjacent strips the magnetic field, produced by the resistive section is kept to a minimum. A plurality of first insulating members 53 are provided, each situated in a respective one of the first and second plurality of slots 47 and 48 of each of the resistor sections. A plurality of thin insulating sheets 54 are provided. Each of the sheets 54 is located between adjacent sides of respective adjacent resistor sections 31–42. Alternate adjacent uppermost strips of the assembly of resistor sections 31–42 starting with sections 31 and 32 are conductively connected together by brazing, soldering or welding, as shown at points 56. Alternate adjacent lowermost strips of the assembly of resistor sections 31–42 starting with the second set of resistor sections are conductively connected together by brazing, soldering or welding, as shown at points 56. Leads 61–65 are brazed to strips of the resistor sections of the assembly. Lead 61 is brazed to the lowermost strip 51a of resistor section 31. Lead 62 is brazed to uppermost strip 51h of resistor section 33. Lead 63 is brazed to lowermost strip 51a of resistor section 36. Lead 64 is brazed to uppermost strip 51h of section 39. Lead 65 is brazed to lowermost strip 51a of section 42. Thus, a continuous resistive element is provided between leads 61 and 65. Leads 62, 63 and 64 represent intermediate taps on the continuous resistive element. The resistor sections 31–42 are bound together with a set of discrete bands 68 of multiple layer, glass cloth tape. The assembly is then vacuum impregnated with an appropriate epoxy resin, suitable for the temperatures to which the assembly is subjected, to fill cracks and crevices and bind the resistor sections into a solid mass. After impregnation of the assembly, the spaces between the bands are wrapped with pressure sensitive adhesive tape 69. This construction forms a thermally insulating jacket over the assembly without providing a continuous membrane that would allow pressure build up when energy is discharged into the resistor assembly.

The first insulating members or splines 53 may be glass epoxy composite board. Thin insulating sheets 54 may be wovens glass cloth. The metallic material of the plates forming the resistor sections may be brass. The length and cross section of the resulting bars or strips formed from the plate of brass is chosen to provide the desired electrical resistance and heat capacity. The positions of the taps or conductive leads 61–65 on the assembly are chosen consistent with the desired partial resistances desired. To minimize the thermal resistance within the body of the assembly, the separating electrical insulator sheets 54 are made thin, typically 0.002 to 0.003 of an inch, and the number of resistor sections is kept to as low as a value as is consistent with other design requirements. The splines 53 serve to minimize the volume of unreinforced resin and to give the partially assembled resistor added rigidity for ease of handling. The bands of tape may be an inch wide with one-half inch spacing between adjacent bands.

The resistor assembly 30 would be substituted for resistors 16–19 of the circuit of FIG. 1 with the advantages set forth above.

While the resistor assembly of the present invention has been described for use in connection with superconductive solenoids operating in the persistent current mode, the resistor assembly can also be used in other circuits such as with superconductive solenoids operating in the non-persistent current mode.

While the invention has been described in a specific embodiment, it will be understood that modifications may be made by those skilled in the art and it is intended by the appended claims to cover all such modifications and changes as fall within the true spirit and scope of the invention.

What is claimed is:

1. A resistor assembly comprising
   a plurality of resistor sections, each section including a resistive plate of parallelepiped outline including a first pair of closely spaced parallel sides and a second pair of remotely spaced parallel sides, a first plurality of narrow parallel slots each extending from one side to the other side of said first pair of sides and from one side of said second pair of parallel sides for a distance short of the other side of said second pair of parallel sides, a second plurality of narrow parallel slots each extending from the one side to the other side of said first pair of sides and from said other side of said second pair of parallel sides for a distance short of said one side of said second pair of parallel sides, said second plurality of slots being interleaved with said first plurality of slots, whereby said plate is divided into a plurality of strips including an uppermost and a lowermost strip, said strips forming a continuous resistive element from said lowermost strip to said uppermost strip, a plurality of first insulating members each situated in a respective one of said first and second plurality of slots, a plurality of thin insulating sheets, means for binding said plurality of resistor sections together with the sides of said first pair of sides thereof in parallel and each of said insulating sheets located between adjacent sides of respective adjacent resistor sections, means for conductively connecting alternate adjacent uppermost strips of said assembly of resistor sections starting with the first set of adjacent resistor sections, means for conductively connecting alternate adjacent lowermost strips of said assembly of resistor sections starting with the second set of adjacent resistor sections, a plurality of conductive leads, each connected to a respective selected strip of said resistor sections, whereby a specific resistive element is provided between a pair of lines, said resistive element being thermally coupled to adjacent resistive elements but electrically insulated therefrom.

2. The resistor assembly of claim 1 in which each of said first pair of closely spaced parallel sides of said resistive plate is of rectangular outline and in which each of said second pair of closely spaced parallel sides of said resistive plate is of rectangular outline.

3. The resistor assembly of claim 1 in which said binding means includes discrete bands of an insulating material surrounding said plurality of resistor sections.

4. The resistor assembly of claim 3 in which said insulating material is glass cloth.

5. The resistor assembly of claim 3 in which said plurality of resistor sections is vacuum impregnated with an epoxy resin.

6. The resistor assembly of claim 5 in which the portions of said assembly not covered by said discrete bands of insulating material is covered with pressure sensitive adhesive tape.

* * * * *